United States Patent [19]

Lienhard et al.

[11] 4,327,212
[45] Apr. 27, 1982

[54] ISOINDOLINE-AZINE NICKEL COMPLEX WITH PIPERAZINE

[75] Inventors: Paul Lienhard, Frenkendorf; Francois L'Eplattenier, Therwil, both of Switzerland

[73] Assignee: Ciba-Geigy Corporation, Ardsley, N.Y.

[21] Appl. No.: 151,032

[22] Filed: May 19, 1980

[30] Foreign Application Priority Data

May 29, 1979 [CH] Switzerland .................. 4996/79

[51] Int. Cl.³ .................. C07D 403/12; C07D 403/14
[52] U.S. Cl. .................................. 544/225; 8/686
[58] Field of Search ........................... 544/225

[56] References Cited

U.S. PATENT DOCUMENTS 4,016,156 4/1977 Weber ........................... 427/158
4,016,157 4/1977 Vuitel et al. ..................... 544/225
4,022,770 5/1977 L'Eplattenier ................. 260/326.1

Primary Examiner—Mark L. Berch
Attorney, Agent, or Firm—Harry Falber

[57] ABSTRACT

The isoindoline-azine nickel complex of the formula

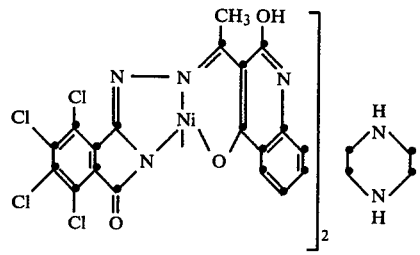

colors plastics, lacquers and printing inks in yellow shades of outstanding fastness properties.

1 Claim, No Drawings

ISOINDOLINE-AZINE NICKEL COMPLEX WITH PIPERAZINE

The present invention relates to the isoindoline-azine nickel complex of the formula

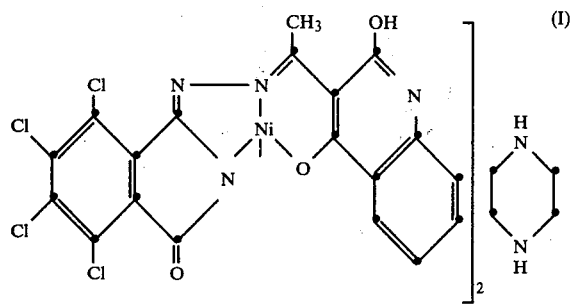

The compound of the formula I is obtained by reaction of the ligand of the formula II

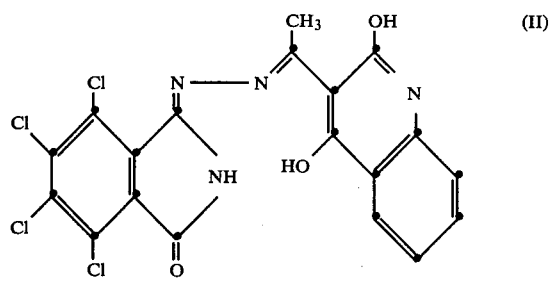

with a nickel donor and piperazine in the molar ratio 2:2:1.

The ligand of the formula II is obtained by methods known per se by condensation of the known 4,5,6,7-tetrachloroisoindolin-1-on-3-ylidene-hydrazine with 3-acetyl-2,4-dihydroxyquinoline, desirably at elevated temperature in an organic solvent such as alcohol, glacial acetic acid, dioxane, dimethyl formamide, N-methylpyrrolidone, butyrolactone, glycol, glycol monoethyl ether, chlorobenzene or o-dichlorobenzene.

As the resultant azine is reluctantly soluble in the above solvents, it can be easily isolated by filtration.

The reaction of the ligand of the formula II with the nickel donor and piperazine is also desirably carried out at elevated temperature, preferably in the range from 50° to 150° C., in one of the solvents specified above.

The nickel donor employed is advantageously a salt of nickel, especially a formiate, acetate or stearate.

The isoindoline-azine nickel complex of the formula I is a productive yellow pigment which can be used in finely dispersed form for pigmenting organic material of high molecular weight, e.g. cellulose ethers and esters, such as ethyl cellulose, nitrocellulose, cellulose acetate, cellulose butyrate, natural resins or synthetic resins, such as polymerisation resins or condensation resins, e.g. aminoplasts, especially urea-formaldehyde and melamine-formaldehyde resins, alkyd resins, phenolic plastics polycarbonates, polyolefins such as polystyrene, polyvinyl chloride, polyethylene, polypropylene, polyacrylonitrile, polyacrylates, polyamides, polyurethanes or polyesters, rubber, casein, silicone and silicone resins, singly or in mixtures.

The high molecular weight compounds specified above can be both in the form of plastics, melts, or of spinning solutions, lacquers, paints or printing inks. Depending on the end use, it is advantageous to use the novel pigments as toners or in the form of preparations.

The colourations obtained are distinguished by excellent colour strength, brilliance of shade, good fastness to light, atmospheric influences, heat, overstripe bleeding and migration, as well as by good gloss.

The complex of the formula I is readily dispersible in lacquers and plastics. Mill base formulations in lacquers are distinguished by advantageous flow properties.

Compared with the pigment described in Example 81 of German Offenlegungsschrift No. 2 539 034, the pigment of this invention is distinguished by greater colour strength and easier accessibility.

The invention is illustrated by the following Examples, in which percentages are by weight unless otherwise stated.

EXAMPLE 1

61 g of 3-acetyl-2,4-dihydroxyquinoline and 90 g of 4,5,6,7-tetrachloro-isoindolin-1-on-3-ylidene-hydrazine are stirred into 2500 ml of ethylene glycol monoethyl ether. The mixture is stirred until homogenised, then heated to 100°–110° C. and stirred for a further 3 hours. The resultant yellow reaction product (ligand) is collected hot by filtration, washed with ethylene glycol monoethyl ether and methanol, and dried in vacuo at 80° C. Dry weight: 130 g (90% of theory).

Elemental analysis:

| % | | C | H | N |
|---|---|---|---|---|
| $C_{19}H_{10}Cl_4N_4O_3$ | calc. | 47.14 | 2.08 | 11.57 |
| | found | 46.9 | 2.2 | 11.6 |

77.4 g of finely powdered ligand are suspended in 2500 ml of dimethyl formamide, then 6.9 g of piperazine are added and the mixture is stirred for 15 minutes at room temperature. To the suspension are added 44 g of nickel acetate tetrahydrate and the mixture is heated in the course of 1 hour to 100°–110° C. and then stirred for a further 3 hours at this temperature. The reaction mixture is filtered hot and the product is washed thoroughly with dimethyl formamide, methanol and acetone and dried in vacuo at 80°–90° C., affording 90.5 g (96.8% of theory) of a productive yellow pigment.

Elemental analysis:

| % | | C | H | N | Cl | Ni |
|---|---|---|---|---|---|---|
| $C_{42}H_{26}Cl_8N_{10}Ni_2O_6$ | calc. | 43.20 | 2.24 | 11.99 | 24.29 | 10.06 |
| | found | 43.3 | 2.3 | 12.1 | 23.8 | 9.62 |

EXAMPLE 2

2 g of the pigment obtained in Example 1 are ground with 36 g of toner dehydrate, 60 g of boiled linseed oil of medium viscosity and 2 g of cobalt linoleate on a three roll mill. The yellow prints obtained with the resultant colour paste are strong and of excellent lightfastness.

EXAMPLE 3

0.6 g of the pigment obtained in Example 1 is mixed with 67 g of polyvinyl chloride, 33 g of dioctyl phthalate, 2 g of dibutyl tin dilaurate and 2 g of titanium dioxide and the mixture is processed to a thin sheet for 15 minutes at 160° C. on a roll mill. The yellow colouration obtained is strong and fast to migration, heat and light.

EXAMPLE 4

10 g of titanium dioxide and 2 g of the pigment obtained in Example 1 are ground for 48 hours in a ball mill with 88 g of a mixture of 26.4 g of coconut alkyd resin, 24 g of melamine/formaldehyde resin (50% solids content), 8.8 g of ethylene glycol monomethyl ether and 28.8 g of xylene. The resultant lacquer is sprayed onto an aluminium sheet, predried for 30 minutes at room temperature and then stoved for 30 minutes at 120° C. The yellow finish obtained has good colour strength and very good fastness to overstripe bleeding, light and atmospheric influences.

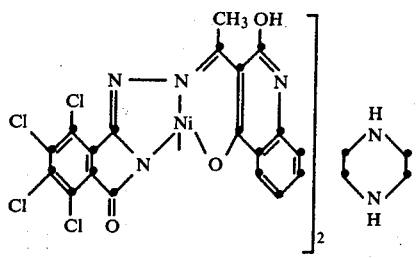

What is claimed is:

1. The isoindoline-azine nickel complex of the formula